United States Patent [19]

Tulip

[11] 4,105,952
[45] Aug. 8, 1978

[54] HIGH REPETITION RATE PULSED LASER DISCHARGE SYSTEM

[76] Inventor: John Tulip, 11823 87th Ave., Edmonton, Alberta, Canada

[21] Appl. No.: 688,927

[22] Filed: May 21, 1976

[51] Int. Cl.² ............................................ H01S 3/097
[52] U.S. Cl. ........................ 331/94.5 PE; 331/94.5 G
[58] Field of Search ......................... 331/94.5; 330/4.3

[56] References Cited

U.S. PATENT DOCUMENTS 3,745,481   7/1973   Erickson et al. .............. 331/94.5 PE

OTHER PUBLICATIONS

Burnett et al., Simple Electrode Configuration for UV Initiated High-Power TEA Laser Discharges, J. Appl. Phys., vol. 44, No. 8 (Aug. 1973) pp. 3617-3618.

Primary Examiner—William L. Sikes
Attorney, Agent, or Firm—Stevens, Davis, Miller & Mosher

[57] ABSTRACT

A high repetition rate pulsed glow discharge system for molecular gas lasers wherein sparks positioned adjacent to the discharge electrodes provide both ionization for the suppression of arcing and high repetition rate switching means for the energy storage circuit. The preferred energy storage circuit is a Marx Generator voltage multiplying circuit.

6 Claims, 2 Drawing Figures

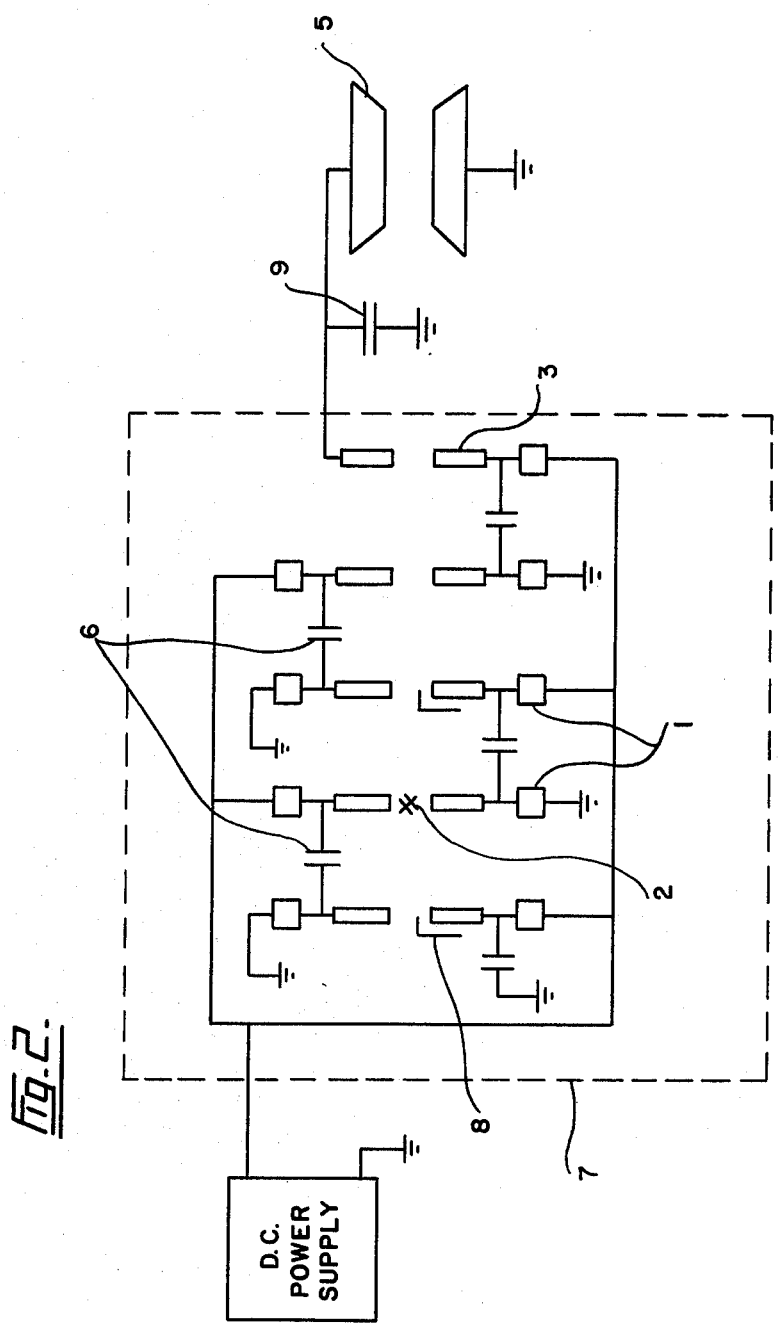

HIGH REPETITION RATE PULSED LASER DISCHARGE SYSTEM

BACKGROUND OF INVENTION

1. Field of Invention

This invention relates to pulsed electric gas discharges and more particularly to preionization and switching of such discharges.

2. Description of Prior Art

The various arts dealing with pulsed gas discharges have long been known. However the recent advent of high powered pulsed gas lasers, and particularly the transversely excited, atmospheric pressure (T.E.A.) carbon dioxide laser has led to the development of high pressure large volume pulsed glow discharges. In gas lasers the function of the electric discharge plasma is to excite atoms or molecules of a lasing gas to higher energy states. This function may be achieved by the pulsed glow discharge which produces a large uniform volume of plasma uniformly attached to the electrodes of the discharge and which has a high electron temperature. However at atmospheric pressure or thereabout the pulsed glow discharge is inclined to arcing unless otherwise constrained. On arcing the discharge current becomes highly localized into a filamentary conducting channel which is unsuitable for laser excitation. Several means of suppressing the arcing of the pulsed glow discharge have recently been developed. In the glow discharge the ionization of the gases is provided directly by the current passing through the gases. At high pressures a tendency exists for the direct ionization to occur nonuniformly throughout the discharge volume which eventually leads to the highly ionized filamentary volume which is the arc. If, however, auxilliary means of ionization is provided which does not depend upon the discharge current then the unstable tendency of the glow discharge is reduced, and arc formation is suppressed. This function may be realized by injecting a high energy beam of electrons between the discharge electrodes. Alternatively ionizing electromagnetic radiation from an auxilliary discharge adjacent to the discharge electrodes may be used. A capacitive spark discharge of short duration and of high voltage will provide copious ionizing ultra-violet radiation which will propogate in atmospheric pressure gases for many cm's. Consequently such will provide arc suppression when disposed along the length of the discharge electrode if concomitant with the discharge current.

When the discharge is pulsed many times each second a build up of transient gas species occurs between the dicharge electrodes which are deleterious to the discharge, and which cause arcing. Consequently the lasing gas is blown transversely to the electrodes so as to remove such and prevent build up. Furthermore, commutation of the discharge current at high repetition rate requires special means. The typical switching means for pulsed discharges is the spark gap. The spark previously described as a source of ionizing ultra-violet radiation may be adapted to switch energy storage capacitors to the discharge electrodes. When two metal pin electrodes are immersed in gas of many atmospheres pressure the voltage necessary to cause electrical breakdown between the pin electrodes is many thousands of volts. Moreover when the breakdown or spark occurs a highly conducting channel forms so closing the switch. When a spark gap switch is operated at a high repetition rate ionized gases accumulate between the pin electrodes which causes the breakdown voltage to be reduced. Consequently in the blown (or blast) spark gap which is adapted to high repetition rate the gas is removed from between the pin electrodes with a gas jet. An alternative switching means is the hydrogen thyratron.

SUMMARY OF THE INVENTION

The object of the present invention is to simplify the high repetition rate pulsed glow discharge by combining the switching spark gap with the ionizing sparks.

According to the present invention the array of ionizing sparks also serve to switch the energy storage capacitor to the discharge electrodes. According further to the present invention the ionizing sparks are immersed in the flowing laser gases so have high repetition rate capability. According further to the present invention the ionizing sparks are placed downstream of the discharge electrodes so as to avoid discharge contamination.

According to the discharge circuit in one form the sparks are arranged as a Marx Generator circuit. This device serves to multiply the typically low breakdown voltage for spark pins immersed in the laser gases to a higher voltage more suitable to laser excitation. According further to this invention to achieve the duality of purpose described in the foregoing, the Marx generator circuit must be adapted to have a short commutation or switching time.

The advantages and simplifaction afforded by the present invention will become more apparent in the light of the following detailed description of preferred embodiments thereof as illustrated in the accompanying drawings.

BRIEF DESCRIPTION OF DRAWING

FIG. 2 is a simplified schematicized diagram of one embodiment of the present invention employing the ionizing and switching sparks in a Marx Generator voltage multiplying circuit.

DESCRIPTION OF THE PREFERRED EMBODIMENT

Figure 1:
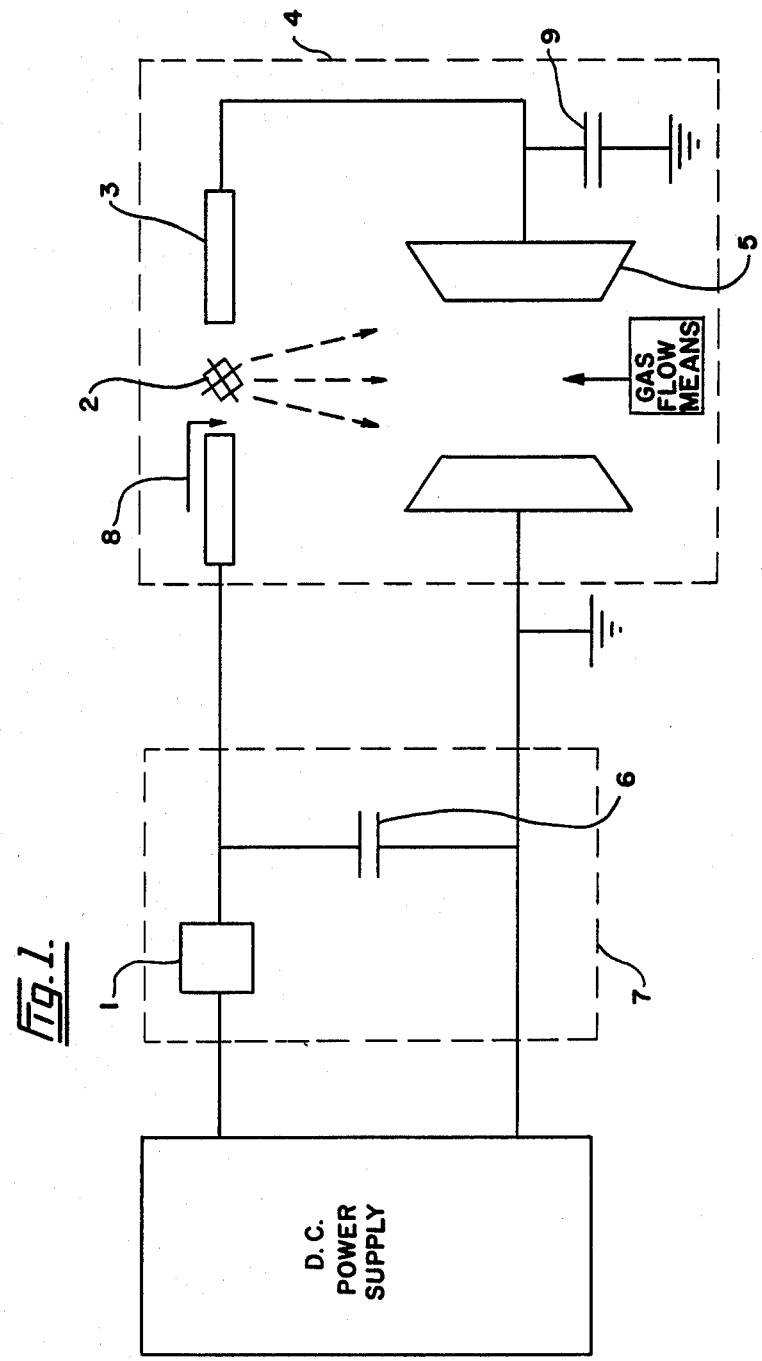
FIG. 1 is a simplified schematized diagram of one embodiment of the present invention showing the ionizing effect of spark switches placed downstream of the discharge electrodes.

Referring now to FIG. 1 the primary object of the present invention is to combine a switching role with the ionizing role of the sparks 2 between the electrode pins 3 held immediately adjacent to the diacharge electrodes 5 within the flowing gas discharge apparatus 4. The energy storage circuit 7 comprising a storage capacitor 6 and charging impedance 1 is connected through the sparks 2 to the discharge electrode 5. When a small triggering current flows through trigger electrodes 8 the sparks 2 form and switch the energy storage circuit 7 to the electrodes, and in thus doing the sparks 2 which are disposed along the edge of the electrode uniformly irradiate and ionize the discharge gases in a manner suitable for arc suppression. After the discharging of the storage circuit the flowing laser gases blow the highly ionized gases away from discharge pins 3 allowing high repetition rate switching. The sparks 2 are disposed along the downstream edge of electrode 5 so that gas species generated within the sparks which are detrimental to the stable glow discharge are swept away from the discharge electrodes. In the embodiment of FIG. 1 an additional capacitor 9, referred to as a peaking capacitor, is connected from electrode 5 to ground potential. Such facilitates the formation of a stable glow discharge by interposing a small time delay between the spark formation and the glow discharge formation, and in addition provides a low impedance discharge circuit free from the inductive impedance of interconnections with the energy storage circuit and spark circuits. Such is not necessary for the formation of a stable glow discharge but will reduce the tendency to arcing at high repetition rate, in particular when the energy storage is large. Likewise the addition of an easily ionized gas in trace concentration to the lasing gases will reduce the tendency of discharge arcing at high repetition rates. In this regard an easily ionized gas with the distinctive property of not electrochemically decomposing in the sparks is nitric oxide.

In the embodiment of FIG. 2, the energy storage circuit is also disposed along the length of the electrode and is interconnected with the sparks in the form of a Marx Generator voltage multiplying circuit. The energy storage capacitors 6 charge through inductive impedance elements 1 in a parallel manner. When a small triggering current flows in the triggering electrodes 8 the sparks 2 form a low impedance path to the discharge electrodes 5 in a manner such that the storage capacitors 6 appear in series at the discharge electrode so as to present a voltage which is the power supply voltage multiplied by the number of capacitors. In this way the low breakdown voltage possible for small spark gaps in the lasing gases may be multiplied by the energy storage circuit 1 of this embodiment to a voltage more compatible with laser excitation. The peaking capacitor 9 is functionally the same as in the foregoing embodiment. The art as it relates to the Marx Generator circuit teaches that only the first and second spark gaps should be triggered if the remaining gaps are coupled by ionizing radiation. This method results in a long delay time, hereon referred to as commutation time, for the breakdown to propogate to the discharge electrode, in particular when the energy storage capacitors are large. In this embodiment where the sparks have a duality of purpose the long commutation time results in discharge arcing so that the energy storage circuit is adapted to have a short commutation time, typically less than one microsecond. This adaptation is realized by triggering each gap.

Typical parameters for the preferred embodiment are as follows:

| Typical parameters for the preferred embodiment are as follows: | |
|---|---|
| Electrode Length | 60 cm |
| Electrode Material | carbon or copper |
| Discharge Volume | 0.37 l |
| Discharge Cross - Section | 2.5 cm × 2.5 cm |
| Element Capacitor | 0.1 μF |
| Element inductor | 30 mH |
| Number of Stages | 10 |

| -continued | |
|---|---|
| Typical parameters for the preferred embodiment are as follows: | |
| Charging Voltage | 6 kV |
| Energy Storage | 20 J |
| Pin Spacing | 1 cm |
| Pin - Electrode Distance | 5 cm |
| Gas Mixture | 1:1:8 |
| Flow Velocity | 100 m/s |
| Gap Recovery Strength | 60 kV/ms |

Thus, although the invention has been shown and described with respect to the preferred embodiment thereof it should be understood by those skilled in the art that the foregoing and various other changes and omissions in the form and detail thereof may be made therein without departing from the spirit and scope of the invention.

I claim:

1. An apparatus for producing a pulsed electric glow discharge comprising:
   a high voltage energy storage capacitor circuit,
   a first pair of spaced electrodes for providing a glow discharge therebetween in response to being connected in circuit with said high voltage energy storage capacitor circuit,
   an ionizable gaseous medium disposed between said first pair of spaced electrodes within which said glow discharge may be established,
   means for switching said high voltage energy storage capacitor circuit in circuit with said first pair of spaced electrodes to initiate said glow discharge, said means for switching including a second pair of spaced electrodes forming a switching spark gap located adjacent said first pair of electrodes and electrically connected in series with said first pair of electrodes,
   means for providing a transverse flow of gas between said first pair of electrodes, and
   means for initiating a spark discharge across said second pair of electrodes, said spark discharge providing ionization of said gaseous medium between said first pair of electrodes for suppression of arcs therebetween and further serving to switch said high voltage energy storage capacitor circuit in circuit with said first pair of electrodes.

2. The apparatus according to claim 1 wherein said energy storage capacitor circuit and said second pair of electrodes are arranged as part of a Marx Generator circuit.

3. The apparatus according to claim 2 wherein said Marx Generator circuit has a short commutation time for inhibiting discharge arcing.

4. The apparatus according to claim 2 where a peaking capacitor is provided across said first pair of electrodes.

5. The apparatus according to claim 2 wherein said gaseous medium contains a weak concentration of nitric oxide.

6. The apparatus according to claim 1 wherein said second pair of electrodes is located downstream from said first pair of electrodes with respect to said gas flow.

* * * * *